United States Patent [19]

Fossati et al.

[11] Patent Number: 4,472,799
[45] Date of Patent: Sep. 18, 1984

[54] METHOD OF AND MEANS FOR SYNCHRONIZING A RECEIVING SECTION OF A DIGITAL TELECOMMUNICATION SYSTEM

[75] Inventors: Roberto Fossati; Secondo Gallo, both of Turin; Renzo Ravaglia, Florence; Vincenzo Lazzari, Leini-Turin, all of Italy

[73] Assignee: Cselt-Centro Studi e Laboratori Telecomunicazioni S.p.A., Turin, Italy

[21] Appl. No.: 300,969

[22] Filed: Sep. 10, 1981

[30] Foreign Application Priority Data

Sep. 11, 1980 [IT] Italy ................. 68400 A/80

[51] Int. Cl.³ ................... H04J 3/06; H04B 1/44
[52] U.S. Cl. ......................... 370/29; 370/100; 375/120
[58] Field of Search ............ 370/29, 100; 375/107, 375/111, 120

[56] References Cited

U.S. PATENT DOCUMENTS

| 3,028,487 | 4/1962 | Losee | 250/8 |
| 4,029,905 | 6/1977 | Abraham | 375/120 |
| 4,112,383 | 9/1978 | Burgert | 375/120 |
| 4,122,397 | 10/1978 | Thomas | 328/139 |
| 4,232,318 | 11/1980 | Becker et al. | 370/29 |
| 4,351,000 | 9/1982 | Tokumatsu | 375/120 |

OTHER PUBLICATIONS

Article by R. Montemurro et al., titled "Réalisation d'un équipement terminal numérique d'abonné pour service téléphonique et de données", published by International Switching Symposium (Session 41 B: Subscriber Lines and Peripheral Equipments), Paris, France, vol. 2, May 1979, pp. 926–933, Note: Although title of article is in French language, the body of text is in English.

Primary Examiner—Douglas W. Olms
Attorney, Agent, or Firm—Karl F. Ross

[57] ABSTRACT

A terminal of a digital telecommunication system working in a so-called "ping-pong" mode, with alternate reception and transmission of data words in respective halves of a recurrent operating cycle, has a phase-lock circuit whose oscillator is stabilized by a control signal periodically extracted from an incoming bit stream during the data-receiving phases. The receiving section of the terminal has a branch obtaining incoming bipolar data words from an input/output transformer and converting them, with the aid of a peak detector and an integrator or a monoflop, into respective timing pulses whose leading edges recur with the same periodicity as the data words.

8 Claims, 5 Drawing Figures

METHOD OF AND MEANS FOR SYNCHRONIZING A RECEIVING SECTION OF A DIGITAL TELECOMMUNICATION SYSTEM

FIELD OF THE INVENTION

Our present invention relates to a digital telecommunication system and more particularly to a method of and a circuit arrangement for timing the operation of a receiving section of a terminal of such a system located, for example, at a telephone exchange or at an associated subscriber station.

BACKGROUND OF THE INVENTION

The exchange of digital messages between two intercommunicating stations may take place either simultaneously over parallel channels or alternately via a single transmission link. The latter technique, available for short distances usually limited to several kilometers or miles, has become known as the "ping-pong" mode and involves an alternation of incoming and outgoing data words within a predetermined time slot which in a telephone system may have a duration of 125 $\mu$s. Since a station receiving an incoming data word can transmit an outgoing data word only after the last incoming bit has arrived, the length of such a data word must be well below half a time slot in order to allow for the necessary transit time between the two stations. Thus, the bits of each data word must be rather closely spaced and must have well-defined time positions for proper decoding at the receiving end.

The requisite synchronization of the two terminals can be achieved most expeditiously with the aid of phase-lock circuits controlled by pulses extracted from the incoming message signals. Such circuits have the advantage of being realizable with relatively inexpensive components that can be readily integrated. The extraction of synchronizing pulses from the incoming signals, however, is more problematical; quartz filters suitable for this purpose, for instance, are rather costly.

OBJECTS OF THE INVENTION

Thus, an object of our present invention is to provide an expeditious method of timing the operation of a receiving terminal section for synchronizing same with a source of incoming data words, e.g. a transmitting section of a remote terminal.

A related object is to provide a comparatively simple circuit arrangement for this purpose.

SUMMARY OF THE INVENTION

Our invention is particularly applicable to a digital telecommunication system in which the incoming and outgoing data words have rectangular envelopes of nearly identical length and consist of bits of different logical values each defined by a combination of signal pulses of opposite polarities, as with the conventional WAL-1 or WAL-2 code discussed hereinafter. The receiving terminal section is syhchronized with the source of incoming data words by a succession of clock pulses locally generated with the aid of a phase-locked oscillator whose operation is stabilized by a series of control pulses of a duration not exceeding a predetermined fraction of a recurrent time slot during which an incoming data word is received, that fraction being half a time slot in the case of a system operating in the ping-pong mode. Each control pulse, substantially conforming to the aforementioned word envelope, is produced upon detection of the first bit of an incoming data word so that its leading edge coincides with the first bit which, for the purpose of minimizing envelope-length variations as will become apparent hereinafter, preferably has an invariable configuration. A pulse former connected to an input transformer or equivalent coupling means generates these control pulses and is triggered by a peak detector responsive to the first bit; this pulse former may comprise an integrator and/or a monostable multivibrator or monoflop, the latter preferably having an off-normal period corresponding to half a time slot.

BRIEF DESCRIPTION OF THE DRAWING

The above and other features of our invention will now be described in detail with reference to the accompanying drawing in which.

SPECIFIC DESCRIPTION

Figure 1:
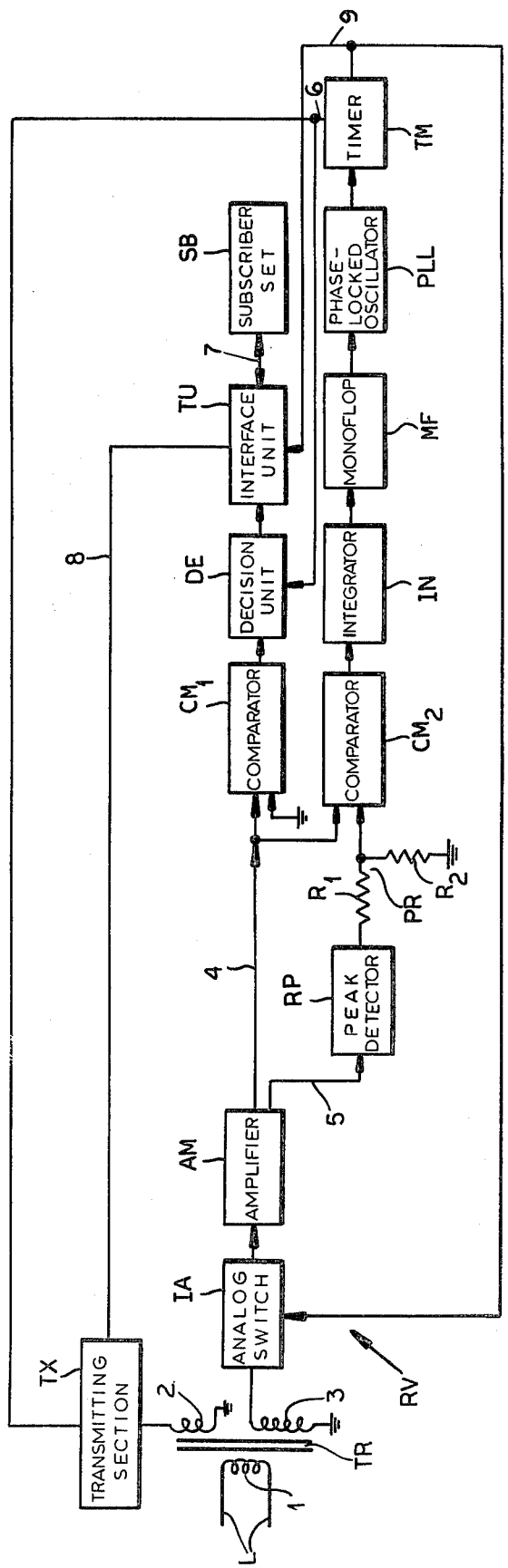
FIG. 1 is a block diagram of a terminal of a digital telephone system embodying our improved circuit arrangement.

In FIG. 1 we have shown a terminal of a subscriber station forming part of a telephone system operating in the aforedescribed ping-pong mode, that station communicating with a nonillustrated exchange or central office via a line L. A transformer TR has a winding 1 connected across line L and has two further windings 2, 3 respectively coupling that line to a transmitting section TX and a receiving section RV. Transmitting section TX is conventional and has not been illustrated in detail.

Receiving section RV comprises an analog switch IA designed to cut off the winding 3 from the remainder of that section in the second half of a time slot of 125 $\mu$s duration during which outgoing data words are transmitted by section TX over line L. Switch IA, when closed during the first half of each time slot, connects winding 3 across an amplifier AM having a pair of output leads 4 and 5, the former extending in parallel to respective inputs of a pair of comparators $CM_1$, $CM_2$ while the latter terminates at a peak detector RP. Comparator $CM_1$ has a grounded second input whereas a second input of comparator $CM_2$ is connected to the output of peak detector RP via a voltage divider PR consisting of two identical high-ohmic resistors $R_1$ and $R_2$. Comparator $CM_2$ works into an integrator IN producing a series of control pulses, one per time slot, whose leading edges trip a monoflop MF serving to reshape these control pulses before feeding them to a synchronizing input of a phase-locked oscillator PLL. A timer TM driven by oscillator PLL has an output lead 6 on which clock pulses are fed to a decision unit DE and to transmitting section TX; these clock pulses are timed to coincide with signal pulses constituting the bits of incoming data words and also to establish the time positions of signal pulses forming the bits of outgoing data words. (If the terminal of FIG. 1 were part of a telephone exchange rather than of a subscriber station, the formation of the outgoing data words would be controlled by an independent local clock.) Decision unit DE receives the output of comparator $CM_1$ and determines therefrom the logical values of the incoming bits; the latter are fed to an interface unit TU converting each reconstituted data word into an analog audio signal to be delivered via a two-way connection 7 to a subscriber set SB from which unit TU receives audio signals to be converted into data words supplied via a lead 8 transmitting section TX. Another output lead 9 of timer TM alternately switches interface unit TU into a receiving mode and a transmitting mode during respective halves of each time slot; a branch of lead 9 extends to switch IA for opening same during the transmitting half.

Figure 2:
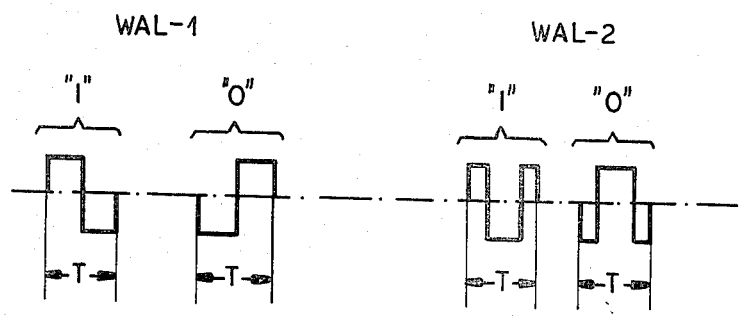
FIG. 2 is a graph illustrating the WAL-1 and WAL-2 codes referred to above.
Figure 3:
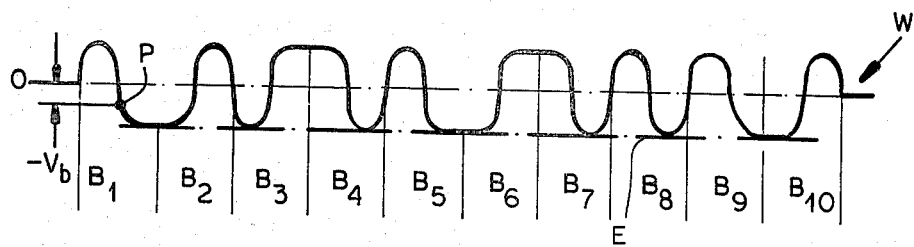
FIG. 3 shows a data word conforming to the WAL-1 code.

In FIG. 2 we have shown at left a bit "1" and a bit "0" represented according to code WAL-1 and a right two corresponding bits represented by code WAL-2, each bit having a duration T equal to a small fraction of a time slot. Both codes are of the non-return-to-zero (NRZ) type, code WAL-1 uses a positive pulse followed by a negative pulse for the "1" bit and the reverse pulse sequence of a "0" whereas code WAL-2 employs two narrower positive pulses bracketing a wider negative pulse for a "1" bit and the reverse configuration for a "0". FIG. 3 shows a ten-bit data word W utilizing code WAL-1; if the last bit $B_{10}$ of word W were "1", instead of "0" as shown, the position of the final positive peak would shift only by T/2. With the WAL-2 code such a shift or jitter would be reduced to T/4; the latter code, however, requires a lager bandwidth.

Figure 4:
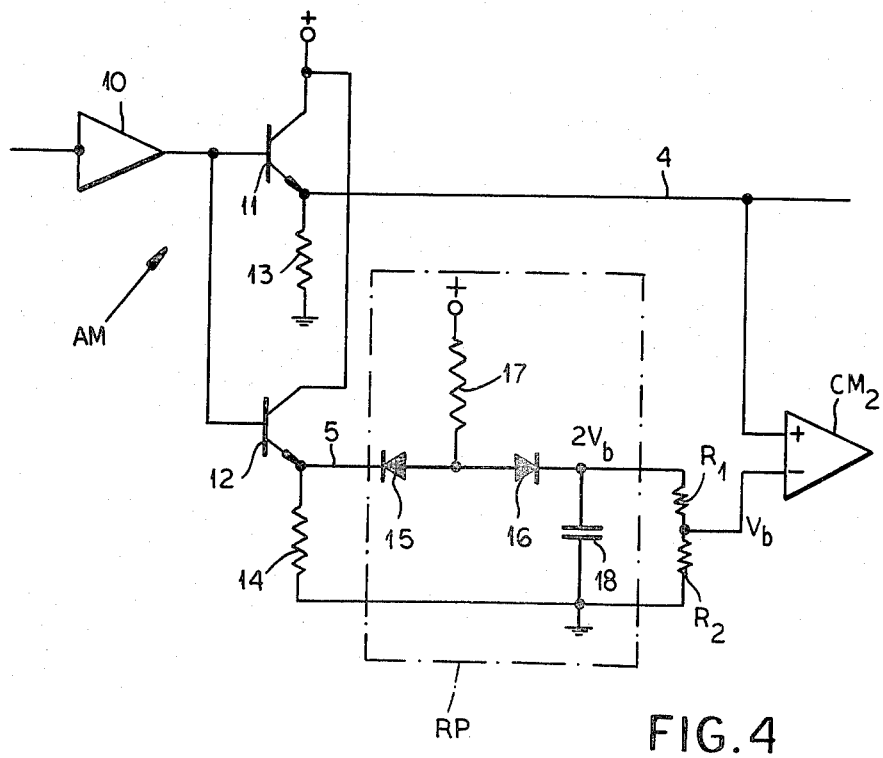
FIG. 4 shows details of a peak detector forming part of the circuitry of FIG 1.

In the system here contemplated, the first bit $B_1$ of any data word has invariably the logical value "1" and thus the configuration shown in FIG. 3; the second bit $B_2$ is also invariable, having the logical value "0", whereas the remaining bits $B_3$–$B_{10}$ vary in accordance with the data transmitted. The polarities referred to are, of course, arbitrary and could be reversed; in the following detailed description of peak detector RP, given with reference to FIG. 4, it will be assumed that this detector responds to positive signal voltages and that the incoming data words are inverted by a first stage 10 of amplifier AM, this amplifier further having a second stage including a pair of NPN transistors 11, 12 with bases connected in parallel to the output of stage 10. The collectors of both transistors are connected to positive voltage while their emitters are grounded through respective resistors 13 and 14; output leads 4 and 5 respectively originate at these emitters. Peak detector RP comprises two diodes 15 and 16 connected back-to-back to positive potential by way of a resistor 17; diode 16 connects resistor 17 to a grounded capacitor 18 which is shunted by the voltage divider consisting of resistors $R_1$ and $R_2$.

The magnitudes of resistors 14 and 17, much lower than those of resistors $R_1$ and $R_2$, are so chosen that, with transistors 11 and 12 cut off in the open state of swith IA (FIG. 1), capacitor 18 is charged to a voltage $2V_b$ whereby a biasing voltage $V_b$ is applied by the voltage divider PR to an inverting input of comparator $CM_2$ whose noninverting input is connected to lead 4. The transistors remain nonconducting in the first half of bit $B_1$ (FIG. 3) during which the output voltage of amplifier stage 10 is negative. When the rising flank of the second pulse of bit $B_1$ (as inverted and ampified by stage 10) passes a point P, comparator $CM_2$ begins to conduct and charges a nonillustrated capacitor of integrator IN (FIG. 1) whose time constant is such as to keep that capacitor charged between negative pulses of word W, causing the integrator to emit a control pulse substantially conforming to the inverted envelope E of word W indicated in FIG. 3; comparator $CM_2$ conducts whenever the voltage on lead 4 exceeds half the peak voltage stored on capacitor 18. While the leading edge of each control pulse is fixed by the point P of FIG. 3, its trailing edge may shift by T/2 or T/4 (depending on the code used) as explained above. Thus, the envelopes of different words W will be rectangular pulses varying in length by not more than half a cycle, or about 5% in this example. Such a shift is avoided, however, by the use of monoflop MF whose off-normal period should at least equal the full length of word W and preferably corresponds to exactly half a time slot so that its output voltage is a square wave both of whose half-cycles can be used for synchronizing purposes. If such precision is not required, the monoflop may be omitted. On the other hand, monoflop MF (if of the nonretriggerable type) could be tripped directly by the first output pulse of comparator $CM_2$ with omission of integrator IN.

If the words W were represented by a WAL-2 code, starting point P would occur sooner but the mode of operation would be otherwise unchanged.

Figure 5:
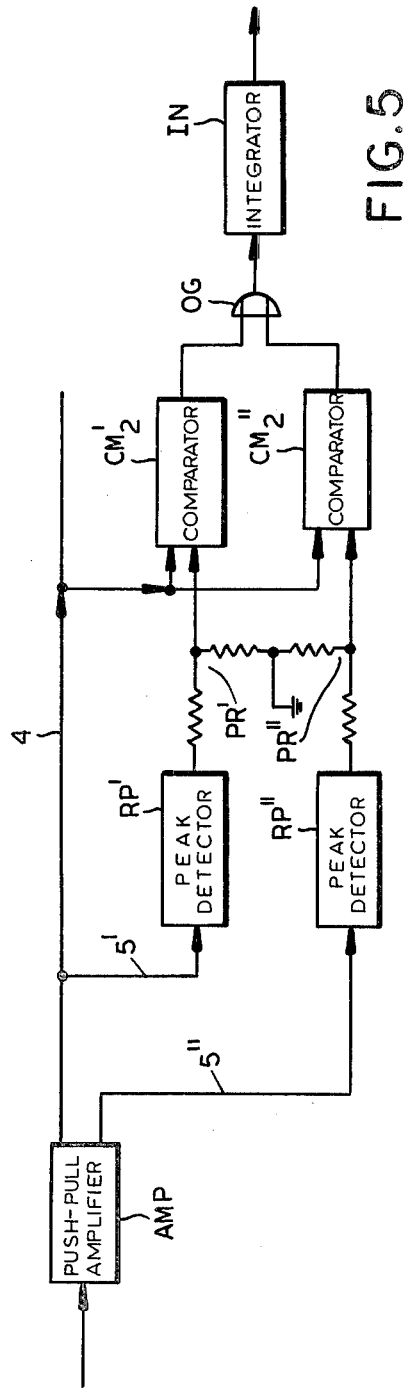
FIG. 5 is a block diagram illustrating a partial modification of that circuitry.

The choice of the rising flank of the second pulse of bit $B_1$ for the start of a control pulse protects the phase-locking loop of oscillator PLL from responding to spurious transients. In order to avoid the aforedescribed jitter of the trailing edge of the control pulse without the use of a monoflop, the data words W may be supplemented by a further bit of invariable configuration; such a lengthening of the data words may, however, be undesirable especially with relatively large transit times. Another possibility of establishing control pulses of constant duration has been illustrated in FIG. 5 where the unipolar amplifier AM has been replaced by a push-pull amplifier AMP with output leads 5' and 5" feeding signal pulses of opposite polarities to respective peak detectors RP' and RP"; two voltage dividers PR' and PR" deliver positive and negative biasing voltages to the inverting inputs of respective comparators $CM_2'$ and $CM_2''$ whose noninverting inputs receive the bipolar signal appearing on lead 4. The outputs of comparators $CM_2'$ and $CM_2''$ are supplied via an OR gate OG to the integrator IN which thus detects the full envelope of word W from the first to the last signal pulse thereof. THis also eliminates the need for an invariable first bit $B_1$ but rules out the use of the second pulse of that bit for the establishment of the starting point.

We claim:

1. A method of timing the operation of a receiving section of a terminal of a digital telecommuncation system in which the reception of incoming data words occurs during a predetermined fraction of a recurrent time slot, said data words having rectangular envelopes of nearly identical length and consisting of bits of different logical values, each of said logical values being defined by a respective code combination of signal pulses of opposite polarities, comprising the steps of:

locally generating a succession of clock pulses by means of a phase-locked oscillator, said clock pulses being used to synchronize said receiving section with the source of the incoming data words;

detecting the first bit of each incoming data word;

producing a series of control pulses each substantially conforming to said envelopes, each control pulse having a duration not exceeding said predetermined fraction of a time slot and further having a leading edge coinciding with the first bit of an incoming data word; and using said control means for stabilizing the operation of said phase-lock oscillator.

2. The method defined in claim 1 wherein said incoming data words are transmitted with invariable first bits.

3. A circuit arrangement for timing the operation of a receiving section of a terminal of a digital telecommunication system in which the reception of incoming data words occurs during a predetermined fraction of a recurrent time slot, said data words being in the form of bipolar signals having rectangular envelopes of logical values, each of said logical values being defined by a respective code combination of voltage pulses of opposite polarities, comprising:

a time base generating a succession of clock pulses for synchronizing said receiving section with the source of the incoming data words, said time base including a local oscillator provided with a phase-locking loop;

coupling means connected to a signal link carrying said incoming data words;

peak-detector means connected to said coupling means for ascertaining the arrival of a first bit of an incoming data word; and pulse-forming means connected to said peak-detector means for producing a series of control pulses each substantially conforming to said envelopes, each control pulse having a duration not exceeding said predetermined fraction of a time slot and further having a leading edge coinciding with the first bit of an incoming data word, said pulse-forming means having an output connected to a phase-stabilizing input of said phase-locking loop.

4. A circuit arrangement as defined in claim 3 wherein said first bit has an invariable configuration, said peak-detector means being biased to respond to a rising flank of the second voltage pulse of said first bit.

5. A circuit arrangement as defined in claim 4 wherein said pulse-forming means includes a voltage divider for deriving from the output of said peak-detector means a reference level of predetermined polarity lower than the peaks of the voltage pulses of the same polarity, and comparison means with inputs connected to said voltage divider and to said coupling means for emitting output pulses in response to signal voltages exceeding said reference level.

6. A circuit arrangement as defined in claim 5 wherein said pulse-forming means further comprises integrating means connected to said comparison means for receiving said output pulses.

7. A circuit arrangement as defined in claim 5 or 6 wherein said voltage divider establishes said reference level at half the amplitude of said peaks.

8. A circuit arrangement as defined in claim 3, 4, 5 or 6 wherein said pulse-forming means includes a monoflop having an off-normal period equaling half of said time slot.

* * * * *